Patented Sept. 20, 1932

1,878,527

UNITED STATES PATENT OFFICE

ROY H. KIENLE, OF SCHENECTADY, NEW YORK, ASSIGNOR TO GENERAL ELECTRIC COMPANY, A CORPORATION OF NEW YORK

SYNTHETIC RESIN AND METHOD OF MAKING THE SAME

No Drawing.   Application filed April 30, 1929. Serial No. 359,421.

This invention relates to new and improved moldable products or synthetic resins and the method of making the same.

In the reaction of an aromatic amine and an aldehyde in acid solution the reaction must not be allowed to proceed beyond a certain point, at which point an alkali, such as caustic soda, is added to effect neutralization and to precipitate the condensation product which is subsequently washed to remove excess of aldehyde and electrolytes present, and is then dried and pressed hot. The preparation of the product in this way using a strong alkali, such as caustic soda, produces a resin which does not readily lend itself to molding. The product so prepared lacks flow and this is a serious draw-back when molding with fillers, particularly as most molding materials require fillers both from an economical and mechanical standpoint.

I have found that the use of a milder alkaline precipitating agent, such as an alkaline earth base, when used to precipitate the condensation product from solution produces a resinous body having a marked improvement in the property of flow under pressure, a product having much better molding properties and more uniform distribution of the resinous body among the filler particles.

In carrying out my invention I proceed as outlined above, but instead of using a strong alkali, such as caustic soda, I substitute an equivalent amount of an alkaline earth base, such as lime (CaO), magnesium hydroxide, or barium hydroxide, or an equivalent amount of the respective carbonates of such alkaline earth metals suspended in water.

As examples of the process I cite the following:

Aniline, hydrochloric acid, and formaldehyde are allowed to interact in a suitable container in the following proportions:

Aniline _____ 1 mol
Hydrochloric acid _____ 1 mol
Formaldehyde _____ 1.1 mols
Water _____ 3000 cc.

The aniline and water are first mixed together then the hydrochloric acid is added and the temperature is adjusted to about 28° C. The formaldehyde is then added keeping the temperature of the mixture below 40° C. After this solution has been allowed to stand for about an hour, 1 mol of an alkaline earth base, such as lime, magnesium hydroxide or barium hydroxide is added, and the solution is vigorously stirred until neutralization is complete. The resulting precipitate is then freed from electrolytes, dried and pressed hot.

Instead of using aniline I may use any other aromatic amine, as for example benzidine. Using benzidine I employ the following formula:

Benzidine _____ 1 mol
Aldehyde (formaldehyde) _____ 1.1 mols
Hydrochloric acid _____ 1 mol
Alkaline earth base (lime) ____ 1 mol
Water _____ 3000 cc.

and proceed as above outlined.

Also instead of using formaldehyde I may use any aldehyde, such as acetaldehyde or furfural, etc. In making such substitutions care must of course be exercised in selecting the proportions employed.

To illustrate the advantageous results obtained, resins formed by the use of different precipitating agents, were subjected to plasticity tests. As a plasticity test the following was used: The amount of flow of the resinous material through a standard orifice, under a given temperature and pressure, and for a given time, was measured.

Size of orifice
   used _____ approximately 10 mils
Temperature ___ 150° C.
Pressure _____ 3,000 pounds per square inch
Time _____ 10 min.

Under these conditions the amount of flow obtained is listed beside each of the precipitating agents used as shown below:

Inch
NaOH _____ ¼
Na₂CO₃ _____ ¼
CaO _____ 1
Ba(OH)₂ _____ 1
Mg(OH)₂ _____ 1

It will be observed that the amount of flow is markedly increased when a milder base, such as the alkaline earth bases used are employed as preciptating agents, instead of a strong alkali.

A point to be noted is that in using an alkaline earth base to precipitate the condensation product a much more soluble salt, is obtained than when a stronger base, as for instance NaOH is used. This allows the precipitate to be washed free of the electrolyte in a considerably shorter period of time, thus reducing the time involved in carrying out the process which is in itself an economical advantage.

What I claim as new and desire to secure by Letters Patent of the United States is:

1. The process of preparing a resinous product which consists in treating a primary aromatic amine with an aldehyde in the presence of an acid which forms an addition product with the amine, neutralizing the acid with an alkaline earth base, and subjecting the precipitate so formed to heat and pressure.

2. The process of preparing a resinous product which consists in treating a primary aromatic amine with formaldehyde in the presence of an acid which forms an addition product with the amine, neutralizing the acid with an alkaline earth base, and subjecting the precipitate so formed to heat and pressure.

3. The process of preparing a resinous product which consists in treating aniline with formaldehyde in the presence of a mineral acid, neutralizing the acid with an alkaline earth base, and subjecting the precipitate so formed to heat and pressure.

4. The step in the process of preparing a resinous product which consists in precipitating the moldable condensation product of a primary aromatic amine and an aldehyde in mineral acid solution with an alkaline earth base.

5. The step in the process of preparing a resinous product which consists in precipitating the moldable condensation product of aniline and formaldehyde in mineral acid solution with an alkaline earth base.

6. The process of preparing a resinous product which consists in reacting aniline with formaldehyde in mineral acid solution, neutralizing the acid with lime, separating the precipitate so formed, drying, and compressing the same under heat.

7. The product obtained by the precipitation of the condensation product of a primary aromatic amine and an aldehyde in a solution of acid which forms an addition product with the amine, with an alkaline earth base, which product is moldable under heat and pressure.

8. The product obtained by the precipitation of the condensation product of aniline and formaldehyde in acid solution with an alkaline earth base, which product is moldable under heat and pressure.

9. The product obtained by the precipitation of the condensation product of aniline and formaldehyde in acid solution with lime, which product is moldable under heat and pressure.

In witness whereof, I have hereunto set my hand this 29th day of April, 1929.

ROY H. KIENLE.